United States Patent [19]
Kim

[11] Patent Number: 5,872,704
[45] Date of Patent: Feb. 16, 1999

[54] LOW VOLTAGE SUPPLY CUTOFF CIRCUIT FOR AN ELECTRONIC APPLIANCE

[75] Inventor: Kwang-Su Kim, Suwon, Rep. of Korea

[73] Assignee: SamSung Electronics Co., Ltd., Suwon, Rep. of Korea

[21] Appl. No.: 885,895

[22] Filed: Jun. 30, 1997

[30] Foreign Application Priority Data

Jun. 29, 1996 [KR] Rep. of Korea ................. 1996 26069

[51] Int. Cl.⁶ .................................................. H02M 3/335
[52] U.S. Cl. .............................................. 363/20; 363/21
[58] Field of Search ................................ 363/18, 19, 20, 363/21; 323/299, 301, 303; 361/86, 88, 92

[56] References Cited

U.S. PATENT DOCUMENTS

| | | |
|---|---|---|
| 3,639,777 | 2/1972 | Boilinger . |
| 3,646,359 | 2/1972 | Boilinger . |
| 3,684,896 | 8/1972 | Boilinger . |
| 3,745,375 | 7/1973 | Huruse . |
| 3,749,944 | 7/1973 | Luobrecht . |
| 3,836,790 | 9/1974 | Becker . |
| 4,040,116 | 8/1977 | Sheldon . |
| 4,099,068 | 7/1978 | Kobayashi et al. . |
| 4,117,526 | 9/1978 | Bates . |
| 4,150,413 | 4/1979 | Nerem . |
| 4,439,805 | 3/1984 | Tarleton . |
| 4,447,841 | 5/1984 | Kent . |
| 4,488,057 | 12/1984 | Clarke . |
| 4,618,780 | 10/1986 | Ikoma et al. . |
| 4,688,158 | 8/1987 | Peterson et al. ........................... 363/21 |
| 4,876,495 | 10/1989 | Palanisamy et al. . |
| 4,916,569 | 4/1990 | Konopka . |
| 4,984,145 | 1/1991 | Dangschat et al. ....................... 363/19 |
| 4,985,818 | 1/1991 | Niederreier ............................... 363/19 |
| 5,063,491 | 11/1991 | Shigeo . |
| 5,357,395 | 10/1994 | Bissell et al. . |
| 5,392,186 | 2/1995 | Alexander et al. . |
| 5,455,503 | 10/1995 | Kohler .................................... 323/273 |
| 5,576,608 | 11/1996 | Nagai et al. . |
| 5,631,504 | 5/1997 | Adahan .................................... 363/21 |
| 5,637,981 | 6/1997 | Nagai et al. . |

*Primary Examiner*—Matthew Nguyen
*Attorney, Agent, or Firm*—Robert E. Bushnell, Esq.

[57] ABSTRACT

A low voltage supply cutoff process and circuit for terminating supply of electric power less than a required minimum voltage to a monitor or a computer system in order to prevent malfunction of the appliance. The circuit may be constructed with a power supply unit is used for rectifying an input alternating current voltage (AC voltage) to a direct current voltage (DC voltage); a switching unit for supplying the DC voltage provided by the power supply unit to the electronic appliance on the basis of a switching signal; a voltage detecting unit for detecting a voltage level applied by the switching unit to the electronic appliance; an overvoltage detecting unit for detecting whether the switching unit supplies an overvoltage to the electronic appliance; a low voltage detecting unit for comparing the output voltages of the power supply unit and the voltage detecting unit in order to determine whether the input AC voltage of the power supply unit is a low voltage with an amplitude less than a predetermined voltage level; a control unit for generating a switching control signal according to the voltage level detected by the voltage detecting unit and generating a switching disenable signal when the overvoltage detecting unit detects the overvoltage or the low voltage detecting unit detects the low voltage; and an oscillating unit for generating the switching signal to operate the switching unit by being oscillated according to the switching control signal and for terminating the switching signal by stopping oscillation when the switching disenable signal is generated.

10 Claims, 2 Drawing Sheets

LOW VOLTAGE SUPPLY CUTOFF CIRCUIT FOR AN ELECTRONIC APPLIANCE

CLAIM FOR PRIORITY

This application makes reference to, incorporates the same herein, and claims all benefits flow accruing under 35 U.S.C. §119 from applications for LOW VOLTAGE SUPPLY CUT OFF CIRCUIT FOR AN ELECTRONIC APPLIANCE earlier filed in the Korean Industrial Property Office on 29 May 1996, and there duly assigned Ser. No. 1996/26069, a copy of which is annexed hereto.

BACKGROUND OF THE INVENTION

1. Field of the Invention

The present invention relates to an electronic appliance such as a monitor or a computer system, and, more particularly, to a low voltage supply cutoff process and circuit for an electronic appliance for interrupting the supply of electric power to the appliance when the supply exhibits less than a required minimum voltage to the appliance.

2. Description of the Related Art

In general, delicate electronic appliance such as a monitor or a microprocessor driven computer system will malfunction when an excessively high voltage is applied to the appliance. For example, application of an overvoltage will cause a monitor to display an unstable image and will cause a computer system to incorrectly recognizes data. Therefore, an electric appliance such as a monitor or a computer system is equipped with a SMPS for supplying stable electric power to the appliance on the basis of the electric power consumption of the appliance. Typical conventional power supply systems seek to protect electronic appliances by stopping the operation of the oscillator when an excessive current flows, that is, when an abnormal voltage occurs in the second power supply. Generally, a low alternating current voltage may be supplied for household use during a low alternating current voltage is supplied; I have noticed that problems will occur however with the operation of an electronic appliance supplied with an abnormal voltage because an electronic appliance will perform abnormal operations when the voltage provided by the power supply is less than the voltage required by each of the circuit elements of the appliance.

SUMMARY OF THE INVENTION

Accordingly, it is an object of the present invention to provide an improved process and circuit for protecting electrical appliances attributable to deleterious variations in the voltage supplied to the appliance.

It is another object to provide a low voltage supply cutoff process and circuit for an electronic appliance using a low voltage detecting unit for detecting an input of a voltage that has an amplitude that is less than a certain voltage, to cut off application of electric power to the appliance and maintain stability of the appliance.

In order to achieve these and other objects, a low voltage supply cutoff circuit for an electronic appliance may be constructed according to the principles of the present invention by comparing the output voltage of the electric power supplied to the appliance with an output voltage of a voltage detecting unit, determining whether an AC voltage of the electric power is less than a predetermined voltage level, and stopping operation of an oscillating unit by applying a control signal to a control unit when the AC voltage is a low voltage that is less than the predetermined voltage level.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
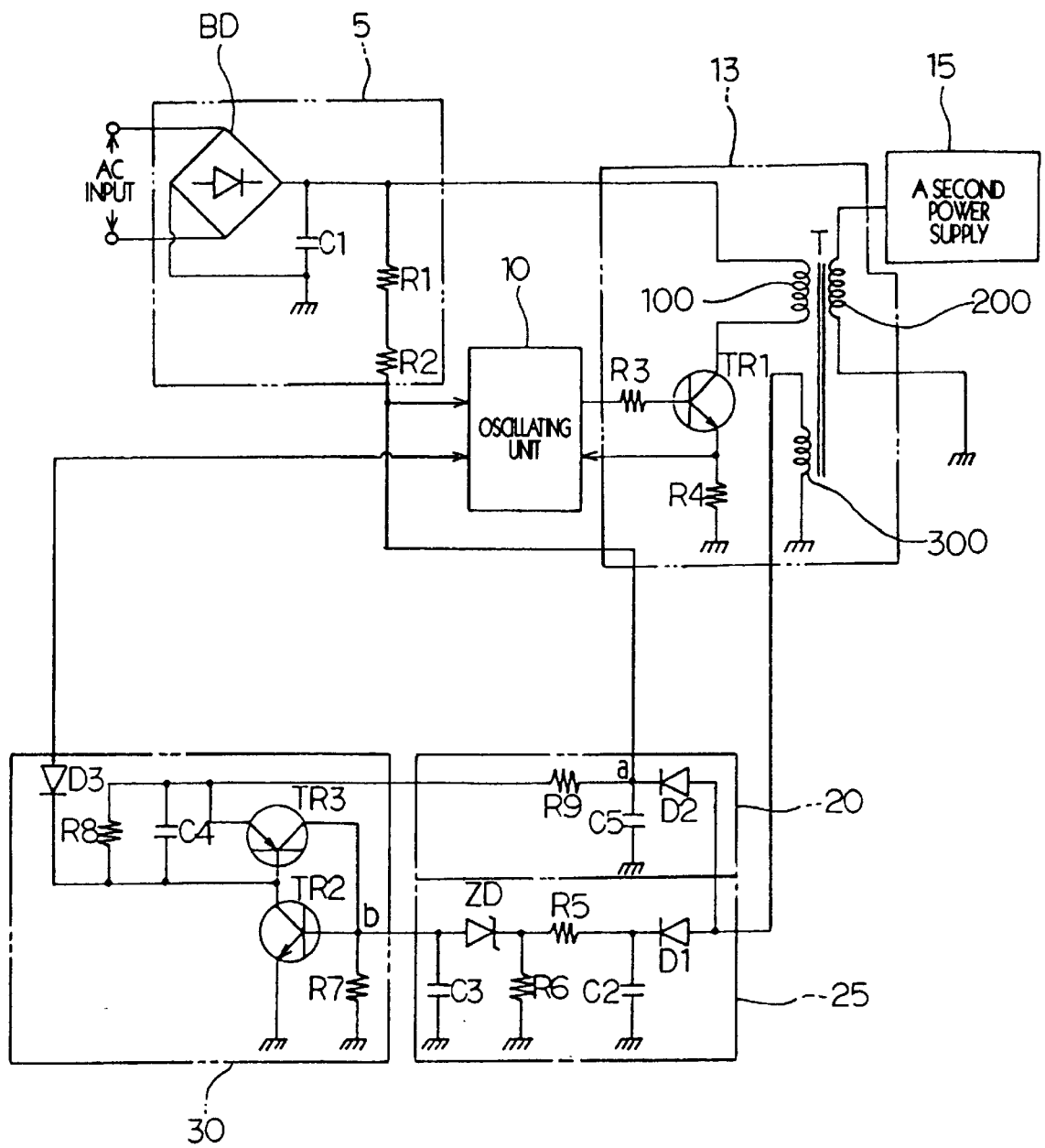
FIG. 1 is a schematic drawing of a conventional SMPS circuit.

FIG. 1 is a view for schematically showing a conventional SMPS circuit. Alternating current power source AC is applied to a bridge diode rectifier BD. An output terminal of the bridge diode rectifier BD is connected to a grounded capacitor C1 and one terminal of a primary winding 100 of a transformer T of switching unit 13 through bridge diode rectifier BD. The output terminal of the bridge diode rectifier BD is connected to first input terminal of an oscillating unit 10 through series connected resistors R1 and R2. A first power supply unit 5 is constituted as shown in FIG. 1.

An output terminal of the oscillating unit 10 is connected to the base electrode of a transistor TR1 of switching unit 13 through a resistor R3. Switching unit 13 is constructed with transistor TR1, resistor R3 coupled between oscillating unit 10 and the base electrode of transistor TR1, resistor R4 coupled between the emitter electrode of transistor TR1 and a local reference potential such as a circuit ground, and transformer T. The other terminal of the primary winding 100 of the transformer T is connected to the collector electrode of transistor TR1, and the emitter electrode of transistor TR1 is connected to grounded resistor R4 and a second input terminal of the oscillating unit 10.

A secondary winding 200 of transformer T is connected to a second power supply unit 15 for supplying operational electric power to an appliance.

A voltage detecting unit 20 may be constructed with a tertiary winding 300 of the transformer T being connected through a diode D2 to one terminal of a resistor R9, a grounded capacitor C5, and the first input terminal of oscillating unit 10.

An overvoltage detecting unit 25 may be constructed with tertiary winding 300 being connected to a grounded resistor R6 and the cathode electrode of a zener diode ZD through a diode D1, a grounded capacitor C2, and a resistor R5 in turn, and the anode electrode of the zener diode ZD is connected to a grounded capacitor C3.

A control unit 30 may be constructed with the juncture of the anode electrode of the zener diode ZD and the grounded capacitor C3, which is the output terminal of overvoltage detecting unit 25, being connected to grounded resistor R7, the base electrode of transistor TR2, and the collector electrode of transistor TR3. The other terminal of the resistor R9, which is the output terminal of the voltage detecting unit 20, is connected to the emitter electrode of the transistor TR3 as well as being connected to the collector electrode of transistor TR2 and the base electrode of transistor TR3 through resistor R8 and capacitor C4, which are connected in parallel to each other. The juncture of resistor R8, capacitor C4, the collector electrode of transistor TR2, and the base electrode of transistor TR3 is connected to an third input terminal of oscillating unit 10 through reverse-biased diode D3.

In operation, a conventional power supply unit constructed as set forth in FIG. 1, bridge diode rectifier BD rectifies an alternating current voltage (AC voltage) applied across its input terminals, the rectified AC voltage is smoothed to a direct current voltage (DC voltage) through capacitor C1, and the DC voltage is applied to oscillating unit 10 as an initial operating voltage through serially coupled resistors R1 and R2. Oscillating unit 10 generates a pulse signal through its output terminal in accordance with the operating voltage input. The pulse signal from oscillating unit 10 turns transistor TR1 connected to primary winding 100 of transformer T on and off; consequently, application of the DC voltage from the capacitor C1 to the primary winding of the transformer T is turned on and off. Therefore, voltages are induced in secondary winding 200 of transformer T, and the induced voltages are rectified and smoothed through the second power supply unit 15 so as to be supplied to an electrically powered appliance (not shown) as an operating voltage. Voltages are induced across tertiary winding 300 in proportion to the levels of the induced voltages across the secondary winding 200. The voltages induced across the tertiary winding 300 are rectified through diode D2 of voltage detecting unit 20, smoothed through capacitor C5, and supplied to oscillating unit 10 as an operating voltage, and are applied to control unit 30 through resistor R9. The voltage applied from voltage detecting unit 20 to control unit 30 is applied to the emitter electrode of transistor TR3 as well as to the base electrode of transistor TR3 through resistor R8 and capacitor C4. Accordingly, transistor TR3 is turned on so that a bias voltage that is established in accordance with the level of the output voltage generated by voltage detecting unit 20 is applied to the base electrode of transistor TR2 at node b since the output voltage of voltage detecting unit 20 drops in amplitude to ground potential through transistor TR3 and resistor R7. Therefore, the turn-on (i.e., the electrical conduction of the semiconducting channel between the collector-emitter electrodes) of transistor TR2 allows an output voltage from voltage detecting unit 20 to flow through the semiconducting channel between the collector-emitter electrodes of transistor TR2 through resistor R8. That is, since a current having an amplitude established in accordance with the bias voltage applied to the base electrode of transistor TR2 flows through the collector electrode of transistor TR2, the voltage measured at the collector electrode of transistor TR2 varies in accordance with an output voltage level of voltage detecting unit 20. The voltage occurring at the collector electrode of transistor TR2 is applied to oscillating unit 10 through diode D3 so that oscillating unit 10 outputs a pulse signal having a pulse width that is established in accordance with an output voltage level of control unit 30. Since the level of a voltage induced across secondary winding 200 is established in accordance with the level of the voltage applied across primary winding 100, and varies when the output pulse signal varies the duration of turn-on and turn-off time periods of transistor TR1, a rated voltage is normally continuously supplied to the electronic appliance.

A voltage induced across tertiary winding 300 of the transformer T is rectified through diode D1 of overvoltage detecting unit 25, smoothed through capacitor C2, divided by resistors R5 and R6, and applied to the cathode electrode of the zener diode ZD. Resistance values of the resistors R5 and R6 are set in the event that an overvoltage is applied to the electronic appliance, in order for the voltage of the cathode electrode of zener diode ZD to exceed over a control voltage. With this setting, when the overvoltage is applied to the appliance, zener diode ZD is turned on and a high voltage is applied to the base electrode of transistor TR2 to operate transistor TR2 in the saturation state, a voltage at the collector electrode of transistor TR2 turns to a low level and a low level voltage is applied to oscillating unit 10. Accordingly, oscillating unit 10 determines that an overvoltage has been applied to the electronic appliance, and does not output a switching signal to transistor TR1 to keep the transistor TR1 in a turned-off state, so that any voltage is not applied to the appliance.

As described above, the conventional power supply system protects an electronic appliance by stopping the operation of the oscillating unit when an overcurrent flows, that is, when an abnormal voltage occurs in second power supply unit 15. Generally, a low alternating current voltage may be supplied to a household appliance when a low alternating current voltage is supplied.

Figure 2:
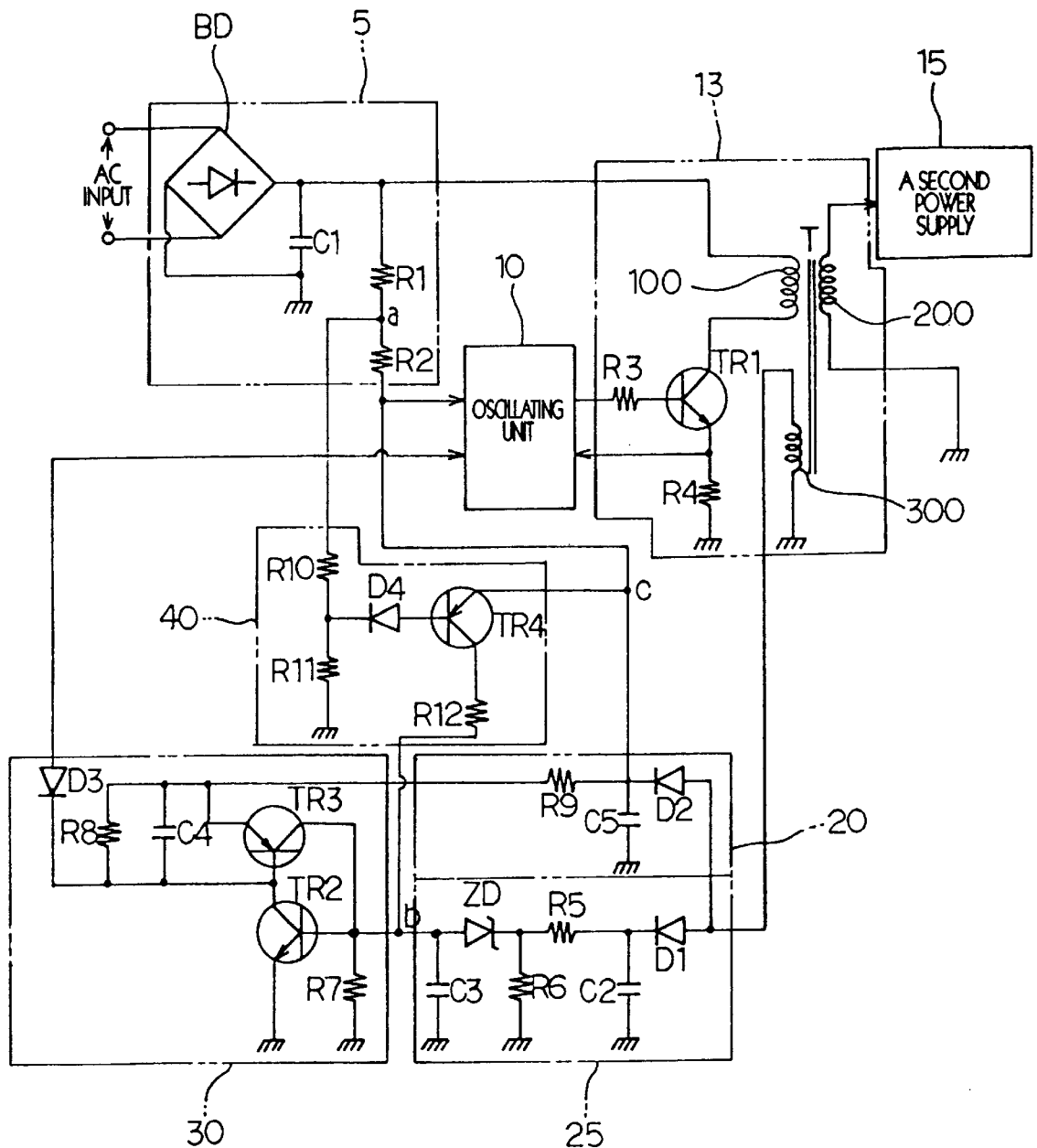
FIG. 2 is a schematic drawing illustrating a low voltage supply cutoff circuit for an electronic appliance constructed according to the principles of the present invention.

Hereinafter, a low voltage supply cutoff circuit for an electronic appliance according to an embodiment of the present invention will be described in detail with reference to the accompanying drawing of FIG. 2, a view for showing a low voltage supply cutoff circuit for an electronic appliance according to an embodiment of the present invention. Description and explanation as to the same parts shown in the conventional power supply system of FIG. 1 will be omitted. As shown in FIG. 2, the low voltage supply cutoff circuit for an electronic appliance constructed as an embodiment of the present invention includes a low voltage detecting unit 40. The low voltage detecting unit 40 is connected to the juncture node b positioned at the base electrode of transistor TR2 of control unit 30 for comparing a voltage at the juncture node a and a voltage at the juncture node c and stopping the driving of oscillating unit 10 when it is determined as a result of the comparison that a low voltage has been inputted. Juncture node a is a connection between resistors R1 and R2 of the first power supply unit 5 as shown in FIG. 1, and juncture node c is positioned at the cathode electrode of diode D2 of voltage detecting unit 20 for inputting a certain voltage to drive oscillating unit 10. Resistors R10 and R11 of low voltage detecting unit 40 are connected to the juncture node a between resistors R1 and R1, and one terminal of resistor R11 is grounded. The cathode electrode of diode D4 is connected to the junction between the resistors R10 and R11, the anode electrode of diode D4 is connected to the base electrode of a PNP-type transistor TR4. The emitter electrode of transistor TR4 is connected to the juncture node c of voltage detecting unit 20. Further, the collector electrode of transistor TR4 is connected to the base electrode of transistor TR2 of control unit 30 through resistor R12.

Operations of the embodiment of the present invention will be described in detail hereinafter, under the assumption that a low voltage is a voltage less than 80 volts in amplitude. First, operations of the embodiment of the present invention will be described when a voltage less than 80 volts is applied. When a voltage of about 50 volts is applied, the inputted voltage is rectified through the bridge diode rectifier BD and filtered through capacitor C1. The voltage filtered by capacitor C1 is applied through resistors R1 and R2, which are called "beginning resistors", to oscillating unit 10 for generating a pulse signal. At this time, the voltage at the junction between resistors R1 and R2 is in proportion to the input voltage of 50 volts and divided again by resistors R10 and R11. A voltage divided by resistors R10 and R11 becomes about 13 volts. A voltage at the juncture node c for supplying a voltage to drive oscillating unit 10 is a certain voltage of 15 volts. Accordingly, diode D4 is turned on and transistor TR4 is also turned on since transistor TR4 is a PNP type, so that a collector electrode voltage of transistor TR4 is applied to the base electrode of transistor TR2 of control unit 30. At this time, the collector electrode of transistor TR2 goes to a low level of voltage and the low level of voltage is applied to oscillating unit 10 in order for the operation of the oscillating unit 10 to stop. Therefore, a switching signal is not applied to transistor TR1 so as to keep the transistor TR1 in a turn-off state, so that electric power is not applied to an appliance.

Next, operations of the embodiment of the present invention will be described when a voltage more than 80 volts in amplitude is applied. Since the diode D4 is turned off when a voltage between the resistors R10 and R11 is over 15 volts, transistor TR4 is also turned off. Therefore, since a bias voltage according to an output voltage level of voltage detecting unit 20 is applied to the base electrode of transistor TR2, transistor TR2 is turned on so that an output voltage of the voltage detecting unit 20 is applied to transistor TR2 through resistor R8. That is, since a current according to a bias voltage applied to the base electrode of transistor TR2 is supplied to the collector electrode of transistor TR2, the collector electrode voltage of transistor TR2 varies in accordance with an output voltage level of voltage detecting unit 20. When the collector electrode voltage of transistor TR2 is applied to oscillating unit 10 through diode D3, oscillating unit 10 outputs a pulse signal having a pulse width that is established in accordance with an output voltage level of control unit 30 so as to change the turn-on and turn-off time period of transistor TR1. The changed time period varies a voltage level which is induced from the primary winding 100 to secondary winding 200 of the transformer T, thereby supplying a rated voltage to an appliance.

As described above, the embodiments detailed in the foregoing paragraphs describe a low voltage supply cutoff process and circuit for an electronic appliance, that endeavors to prevent malfunction of the appliance by automatically interrupting the supply of electric power to the appliance when the supply exhibits less than a required minimum voltage to the appliance. In accordance with the principles of the invention, the low voltage supply cutoff circuit is provided with a low voltage detecting unit for detecting a low voltage less than a certain voltage to operate a monitor and for automatically terminating application of electric power to the appliance so as to prevent malfunction of the monitor, so that the stability of the monitor operation is assured despite the low voltage condition of the power supply.

It is understood that various other modifications will be apparent to and can be readily made by those skilled in the art without departing from the scope and spirit of this invention. Accordingly, it is not intended that the scope of the claims appended thereto be limited to the descriptions set forth herein, but rather that the claims be constructed as encompassing all the features of the patentable novelty that reside in the present invention, including all the features that would be treated as equivalents thereof by those skilled in the art to which this pertains.

What is claimed is:

1. A low voltage supply cutoff circuit for an electronic appliance, comprising:

a power supply unit for rectifying an inputted alternating current voltage to a direct current voltage;

a switching unit connected to said power supply unit for supplying the direct current voltage of the power supply unit to the electronic appliance in response to a switching signal;

a voltage detecting unit connected to said switching unit for detecting a voltage level applied from the switching unit to the electronic appliance;

an overvoltage detecting unit connected to said switching unit for detecting whether the switching unit supplies an overvoltage to the electronic appliance, and for producing a first detection output;

a low voltage detecting unit responsive to output voltages of the power supply unit and the voltage detecting unit for detecting whether the inputted alternating current voltage is less than a predetermined voltage level, and for producing a second detection output;

a control unit for generating a switching control signal according to the voltage level detected by the voltage detecting unit, and responsive to either one of said first and second detection outputs for generating a switching disable signal; and an oscillating unit responsive to said switching control signal for generating the switching signal and for providing same to the switching unit, and responsive to said switching disable signal for cutting off the switching signal to said switching unit.

2. The low voltage supply cutoff circuit as claimed in claim 1, wherein the switching unit includes:

a transistor which is turned on and off in response to the switching signal; and a transformer which is responsive to turn-on and turn-off of the transistor for supplying the direct current voltage level to the electronic appliance.

3. The low voltage supply cutoff circuit as claimed in claim 1, wherein the low voltage detecting unit comprises a transistor which provides the second detection output to the control unit based on a comparison of the output voltages of the power supply unit and the voltage detecting unit, respectively.

4. The low voltage supply cutoff circuit of claim 3, wherein said transistor in the low voltage detecting unit comprises a base, an emitter connected to said power supply unit, and a collector connected to said control unit for providing said second detection output thereto, said low voltage detecting unit further comprising a diode connected in series between said base of said transistor in the low voltage detecting unit and said power supply unit.

5. The low voltage supply cutoff circuit of claim 4, wherein said emitter of said transistor in the low voltage detecting unit is further connected to said voltage detecting unit.

6. A low voltage supply cutoff circuit for an electronic appliance, comprising:

power supply means for providing a direct current voltage;

switching means connected to said power supply means for supplying the direct current voltage to said electronic appliance in response to a switching signal provided as an input to said switching means;

voltage detecting means connected to said switching means for detecting a voltage level applied by said switching means to said electronic appliance, and for producing a first detection output when the voltage level detected comprises an overvoltage;

low voltage detecting means responsive to output voltages of said power supply means and said voltage detecting means for producing a second detection output when the voltage level applied to the electronic appliance is less than a predetermined voltage level;

control means for generating a switching control signal according to the voltage level detected by said voltage detecting means, and responsive to either one of said first and second detection outputs for generating a switching disable signal; and oscillating means responsive to said switching control signal for generating the switching signal and for providing said switching signal to said switching unit, said oscillating means being responsive to said switching disable signal for cutting off the switching signal to said switching means.

7. The low voltage supply cutoff circuit as claimed in claim 6, wherein said switching means includes a transistor which is turned on and off in response to the switching signal, and a transformer which is responsive to turning on and turning off of the transistor for supplying the direct current voltage to the electronic appliance.

8. The low voltage supply cutoff circuit as claimed in claim 6, wherein said low voltage detecting means comprises a transistor which provides the second detection output to said control means based on a comparison of the output voltages of said power supply means and said voltage detecting means, respectively.

9. The low voltage supply cutoff circuit as claimed in claim 8, wherein said transistor in the low voltage detecting unit comprises a base, an emitter connected to said power supply unit, and a collector connected to said control means for providing said second detection output thereto, said low voltage detecting means further comprising a diode connected in series between said base of said transistor in the low voltage detecting unit and said power supply means.

10. The low voltage supply cutoff circuit as claimed in claim 9, wherein said emitter of said transistor in the low voltage detecting unit is further connected to said voltage detecting means.

* * * * *